United States Patent

O'Connor

[11] Patent Number: 5,685,593
[45] Date of Patent: Nov. 11, 1997

[54] STORAGE UNIT FOR PICKUP TRUCKS

[76] Inventor: Patrick H. O'Connor, 100 White Cedar, Sedona, Ariz. 86351

[21] Appl. No.: 308,133

[22] Filed: Sep. 19, 1994

[51] Int. Cl.[6] .................................................. B60R 13/01
[52] U.S. Cl. ........................ 296/39.2; 296/100; 224/404
[58] Field of Search ..................... 296/39.2, 39.1, 296/39.3, 37.6, 97.23, 100; 105/423; 410/129; 224/402, 403, 404, 405, 539, 540, 541, 542, 543, 544

[56] References Cited

U.S. PATENT DOCUMENTS

| | | | |
|---|---|---|---|
| 4,917,429 | 4/1990 | Giger | 296/37.6 |
| 4,944,612 | 7/1990 | Abstetar et al. | 296/39.2 |
| 5,154,478 | 10/1992 | Erickson et al. | 296/39.2 |
| 5,232,259 | 8/1993 | Booker | 296/37.6 |

FOREIGN PATENT DOCUMENTS 2062499  1/1993  Canada ................... 296/39.2

*Primary Examiner*—Andrew C. Pike
*Attorney, Agent, or Firm*—Gregory J. Nelson

[57] ABSTRACT

A molded combination storage unit and truck bed liner. A cover which is mounted on rollers and is rearwardly slidable. Storage compartments are defined below the cover. Panels or partitions may be inserted at spaced-apart locations to form subcompartments between the cover and the floor. The panels reinforce the cover to permit heavier loads to be carried on the cover. In alternate embodiments, the cover may be hinged and slidable drawers may be inserted into the storage compartments.

11 Claims, 4 Drawing Sheets

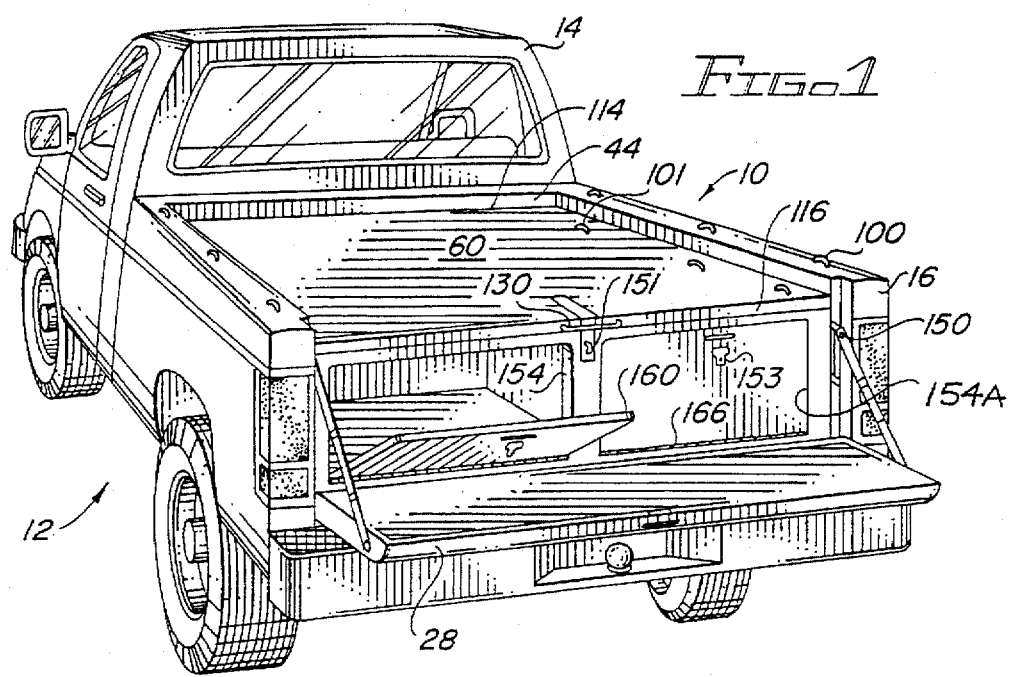
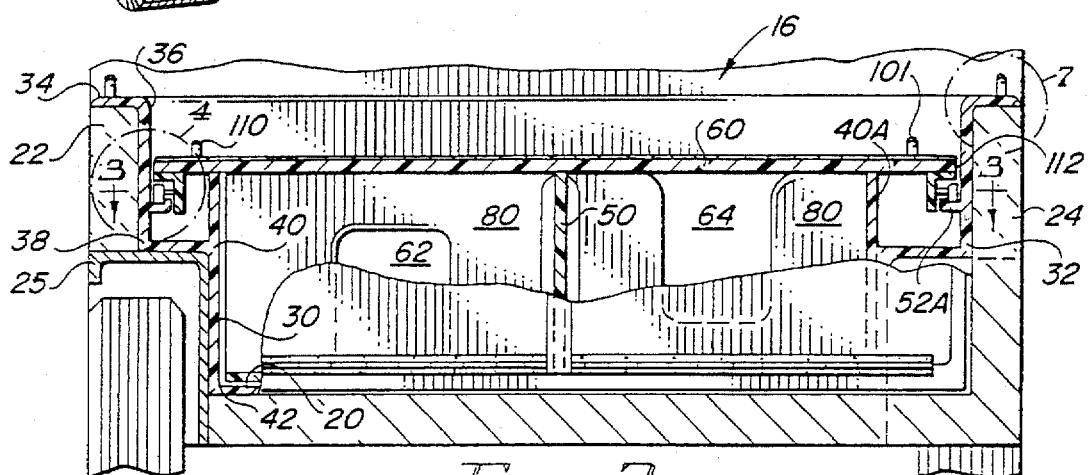
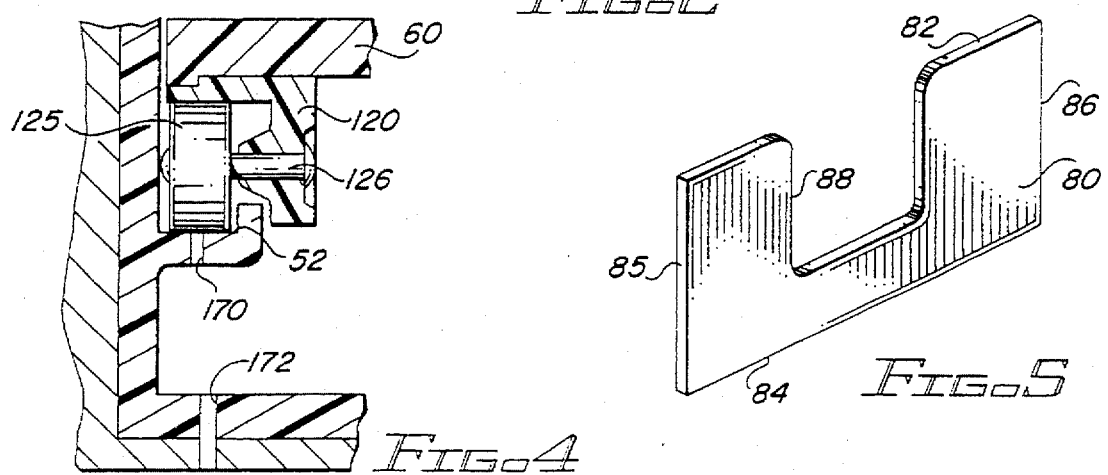

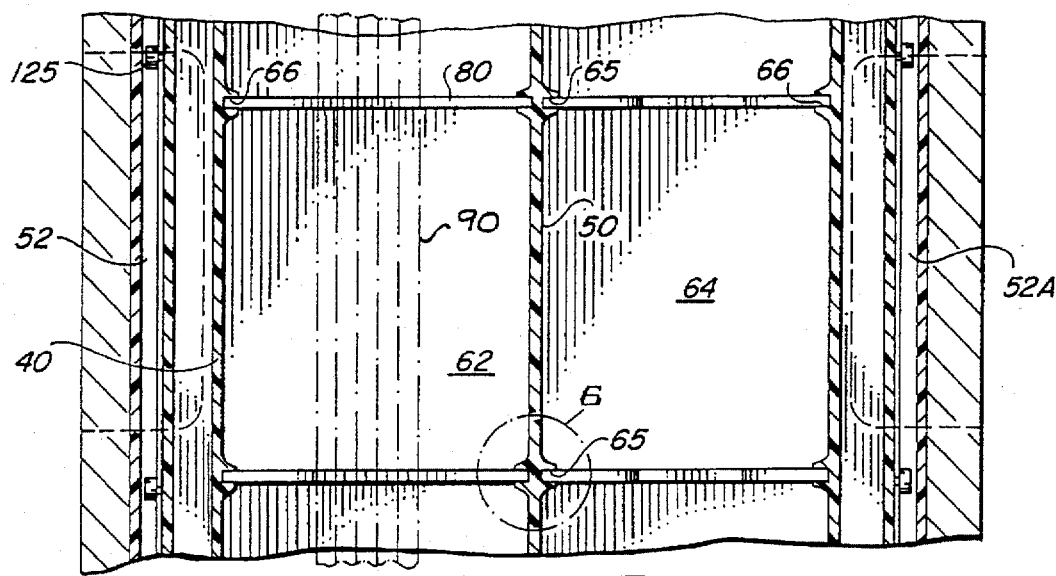
FIG. 3
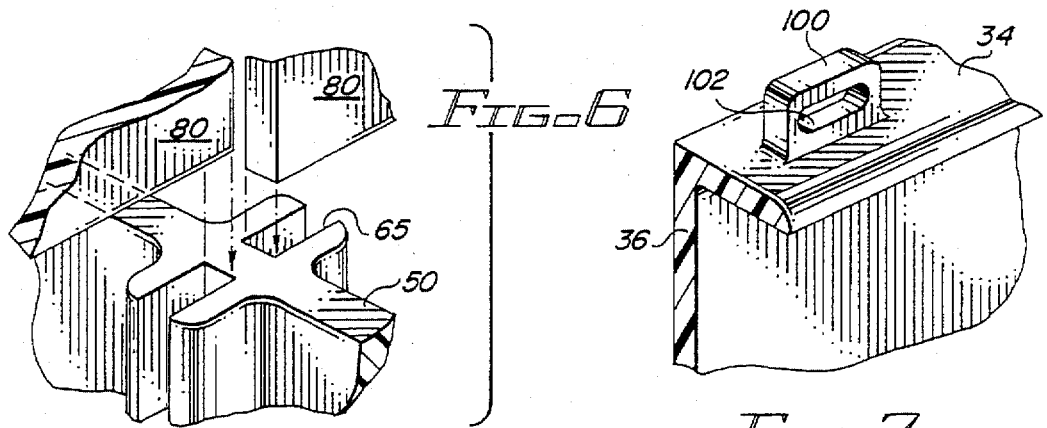
FIG. 6
FIG. 7
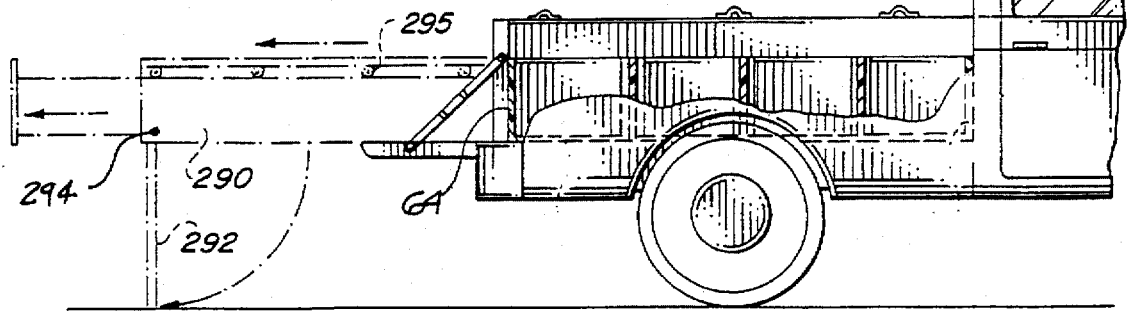
FIG. 8

STORAGE UNIT FOR PICKUP TRUCKS

BACKGROUND OF THE INVENTION

1. Field of the Invention

The present invention relates to storage units for vehicles and more particularly relates to storage units adapted to be installed in the bed of vehicles such as pickup trucks.

2. Description of the Background Art

Pickup trucks are widely used commercially as well as by individuals who have a need to carry various items such as tools, sporting equipment, and the like. One particular problem with pickup trucks is that items placed in the open bed of the truck are not secure and are easily subject to theft. In order to provide security for items, pickup trucks are sometimes provided with tool boxes which are mounted at the forward end of the bed adjacent the cab and which tool boxes have one or more covers which may be locked to secure enclosed items. However, the capacity of conventional tool boxes is limited and such boxes do not accept longer items such as skis, fishing rods, and larger hand or power tools.

In addition to the conventional tool boxes discussed above, various other storage units for use in connection with pickup trucks can be found in the prior art. For example, U.S. Pat. No. 4,573,731 shows a drawer-type storage unit for use in a vehicle. The storage unit defines a raised floor when installed which will support a load in a conventional manner. The storage unit has a drawer which is received in the space between the raised floor and the vehicle. The drawer is supported on heavy-duty roller bearings to facilitate movement between an open and closed position.

U.S. Pat. No. 4,733,898 shows a combination storage unit and auxiliary bed liner which nests onto the bed of a pickup truck. The storage unit covers the open area of the pickup bed with the space between the bed liner and the truck being partitioned to provide multiple storage compartments. Top opening auxiliary storage compartments are formed on each side of the wheel wells. Pull-out drawers are received within the area between the bed liner and the truck bed and extend substantially the entire length of the bed. The pull-out drawers provide storage compartments for tools and equipment. The inventor also states that the drawers can be completely removed. When the tailgate is closed and the access panel is closed, the storage unit is concealed.

U.S. Pat. No. 4,469,364 shows a device which is arrangeable in the load-receiving area of the truck which is used with a cover assembly extending over the bed. Receptacle units are included which may be used independently or in various combinations. Some of the receptacle units can be provided with drawers slidable rearwardly of the truck bed to permit access to stored articles.

Thus, while the prior art does show various storage units for truck beds, there nevertheless exists a need for a secure storage unit which will permit utilization of at least the upper part of the truck bed in a normal load-carrying manner and which provides secure storage compartments below the load-carrying area. The storage unit of the present invention may be commercially used by contractors, electricians, plumbers, and similar skilled tradesmen to store tools in a manner which allows convenient access to the tools. In addition, the storage unit may also be used for secure storage of longer objects such as fishing rods, guns, and the like. The storage compartments may be subdivided or partitioned into a plurality of smaller compartments with the partitions being removable to provide the elongate storage compartments. The partitions also reinforce the cover which serves as the floor of the open bed above the unit. The storage compartment of the present invention is convenient allowing easy access to all of the compartments. An optional pull-out drawer may also be provided.

OBJECTS OF THE INVENTION

It is therefore a principal object of the present invention to provide a secure storage unit for mounting in the bed of a pickup truck which storage unit may be used by contractors, craftsmen, and sportsmen for secure storage of various items.

A related object of the present invention is to provide a storage unit that fits into the bed of a pickup truck and which does not reduce cargo floor space as the storage unit allows the upper surface of the cover of the unit to be utilized for supporting cargo.

Another object of the present invention is to provide secure and convenient storage units which can accommodate items having a length extending to approximately the length of the pickup truck bed.

Another object of the present invention is to provide a secure and spacious storage unit which is weather-resistant and may easily be adapted and installed in a pickup truck bed.

Another object of the present invention is to provide a storage unit for use with a pickup bed which provides secure storage areas which may be selectively subdivided or partitioned as required by the user.

Still another object is to provide a bed-mounted storage unit which has a cover facilitating easy access to the contents and which cover serves as a structurally sound floor for cargo in the bed.

SUMMARY OF THE INVENTION

The above objects are provided in accordance with the present invention in which a combination storage unit and pickup bed liner is positioned in the bed of a pickup truck. The storage unit extends in the open area of the pickup truck to any convenient height and typically has a cover extending at an elevation approximately corresponding to the wheel wells. The storage unit includes a liner which extends over the side walls, front wall, and floor of the truck. The liner may be made of a suitable polymeric material such as polyethylene having high impact resistance, durability, and resistance to scratches, dents, and chemical agents. The liner defines an elongate track at either side in which a planar top or cover is rearwardly slidable. The top may be mounted on appropriate bearings or rollers. The rear end of the storage compartment is provided with one or more access doors which are in abutment with the tailgate when the tailgate is closed to provide security. The storage compartment which extends substantially the entire length of the pickup truck may be longitudinally divided by a longitudinal partition. Removable panels or partitions may be secured to the side walls of the storage compartment and the partition at spaced-apart locations to subdivide the channels into smaller compartments. With the panels removed, the storage compartments extend the effective length of the pickup truck bed to store long items. The panels themselves may be provided with cut-outs to facilitate insertion and storage of longer items. The panels extend vertically between the floor of the pickup bed and the cover and reinforce the cover to increase structural integrity and to permit heavier loads to be carried on the cover.

In one embodiment, an elongate drawer may be inserted in one or both of the storage compartments, which drawer may be extended and supported in a horizontal position for the convenience of the user.

In other embodiments of the present invention, the cover may be hinged to pivot to a generally vertical position to provide access to the storage area or may be foldable in sections having an accordion-like construction to facilitate access to the storage areas. The cover may also be removable at removable hinge pins to provide temporary unobstructed access to the storage areas.

The other objects and advantages of the present invention will be appreciated by those skilled in the art upon reading the detailed description taken in conjunction with the attached drawings in which:

BRIEF DESCRIPTION OF THE DRAWINGS

FIG. 1 is a rear perspective view of a pickup truck equipped with a preferred embodiment of the bed liner and storage unit of the present invention;

FIG. 2 is an end view of a pickup truck as shown in FIG. 1, partly in section, with the access doors partially broken away;

FIG. 3 is a sectional view taken along line 3—3 of FIG. 2;

FIG. 4 is a detail of the roller assembly for the top as indicated in FIG. 2 by the label 4;

FIG. 5 is a perspective view of one of the removable partition panels;

FIG. 6 is a detail view of the connection between the removable panels and the longitudinal divider as indicated in FIG. 3 by the label 6;

FIG. 7 is an enlarged detail view of one edge of the liner and the associated tie-down as indicated by the label 7 in FIG 2;

FIG. 8 is a side view showing the optional storage drawer in an extended position;

DETAILED DESCRIPTION OF THE PREFERRED EMBODIMENT

Figure 9:
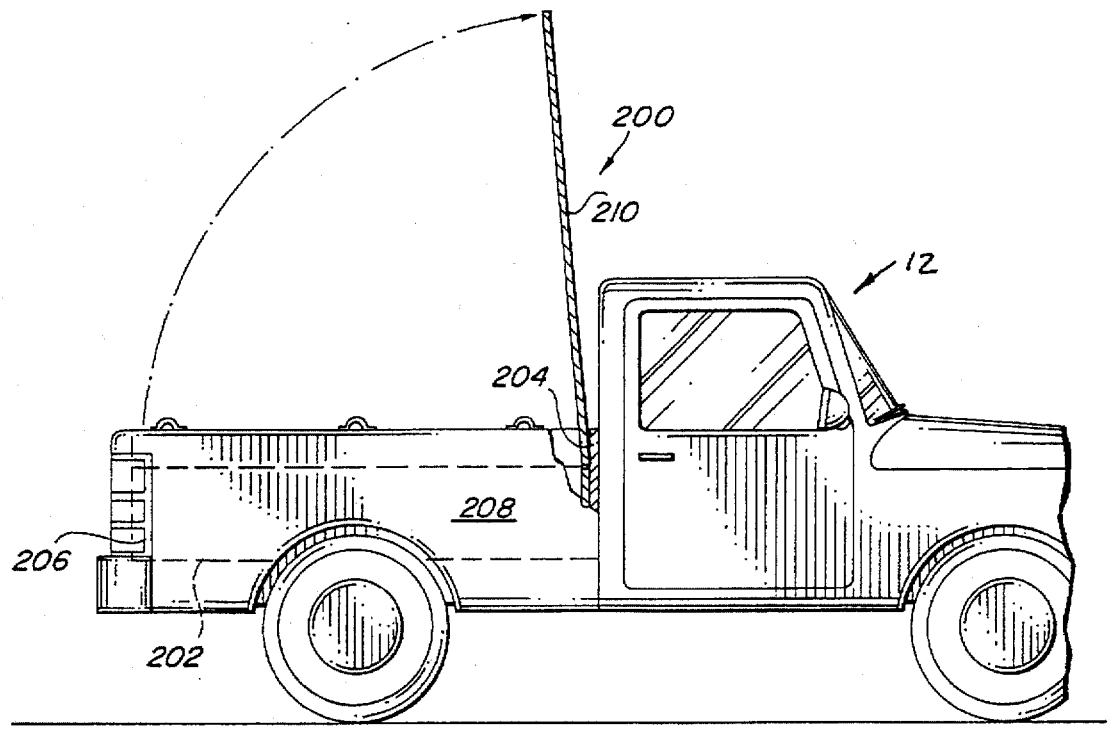
FIG. 9 is a side view of yet another embodiment of the present invention.

In the description that follows, the same or similar elements are represented by the same numerals. The terms "front" and "rear" are used with respect to the orientation of the truck bed. In an exemplary embodiment of the invention as shown in FIGS. 1 to 7, the storage unit of the present invention is generally designated by the numeral 10 and is shown in conjunction with a conventional pickup 12 which has a cab 14 with a bed area 16 rearward of the cab. The bed or cargo area has a horizontal floor or deck 20 and opposite side walls 22 and 24 which are generally recessed at 25 for wheel wells to receive a portion of the rear wheels. A tailgate 28 is hinged for pivotal movement at the rear end of the cargo area. In the closed position, the tailgate 28 is in an upright position extending between the opposite side walls 22 and 24 of the truck bed.

The combination storage unit and bed liner is configured to be snugly received within the cargo area. The liner includes opposite side walls 30 and 32 which each have a horizontal lip 34 at their upper end and a downwardly extending wall section 36 which intersects a horizontal section 38 which rests on the upper edge of the wheel wells 25. Vertical wall sections 40, 40A extend from the floor 42 to an elevation corresponding to the location of the cover. The wall sections are integrally formed along with the floor 42 and front wall 44 from a suitable polymeric material such as polyethylene. Molded polymer materials are preferred because of their ease of fabrication and their general resistance to wear and chemicals. It is to be understood that the particular dimensions and shape of the liner assembly consisting of the opposite side walls, front wall, and floor may vary somewhat depending on the size and configuration of the truck in which the unit is to be installed.

A longitudinally extending central divider 50 is vertically positioned at a suitable location as for example intermediate the side walls 30, 32 of the liner. Preferably, the divider extends to an elevation approximately corresponding to or, as shown, slightly above the elevation of the wheel wells 25 in the truck side walls. Also integrally formed with the liner at opposite side walls at a location generally aligned with the top of the partition are longitudinally extending channels 52, 52A. Channel 52 is best seen in FIG. 4 as it is representative of both channels 52 and 52A. The channels extend from the rear of the truck to the front wall 44 and form a track adapted to facilitate sliding cover 60 forward and rearward to provide access to or to secure the storage compartments 62, 64.

Storage compartments 62, 64 are positioned on opposite sides of the longitudinal divider 50. Referring to FIGS. 3 and 6, it will be noted that the longitudinal divider 50 is provided at spaced apart locations with vertically extending slots 65 which are integrally molded as part of the divider. Vertical slots 66 are provided at aligned locations in the opposite vertical side walls 40 and 40A.

The slots 65, 66 removably receive panels 80 which panels are best seen in FIG. 5. Panels 80 are shown as generally rectangular and also fabricated of a suitable polymer material. The panels are planar having opposite edges 82, 84 and sides 85, 86. A generally U-shaped recess 88 extends in edge 82. The panels 80 may be inserted at suitable locations extending between the center partition 50 and the vertical side wall sections 40, 40A to subdivide the storage areas 62 and 64 into compartments as required. The panels may be placed in position with the recess 88 either disposed upwardly or downwardly depending on load requirements. In either position, the panels provide reinforcement to the cover 60. In the position with the recess 88 disposed downwardly, longer objects can be stored in the compartment. Referring to FIG. 2, it will be seen that storage panels 80 are positioned in the storage compartment 62 with the recesses 88 disposed downwardly and in the storage compartment 64 with the recesses disposed upwardly. The panels extend between the floor of the pickup and the cover 60 to support the cover so that heavier loads may be supported on the top surface of the cover.

The upper horizontal edges 34 extend over the side walls 22 and 24 terminating at the edge of the side walls. A plurality of tie-downs 100 are integrally formed or molded as part of the side wall 36. As seen in FIG. 7, the tie-downs have openings 102 as is conventional. The tie-downs are provided at conveniently spaced-apart locations, three being shown as typical. The tie-downs facilitate securing loads which may be positioned in the upper part of the cargo area in the area between the cover or supported on the cover 60. Additional tie-downs 101 may also be integrally formed as part of the cover to further facilitate load security.

The cover 60 is a generally planar member having opposite edges 110, 112, front edge 114, and rear edge 116. The cover may be of any suitable material, again a polymeric material being preferred. The cover may be reinforced so as to withstand loads as the cover of the cargo area serves as the deck or floor of the cargo area in the space in the upper portion of the truck bed. Referring to FIGS. 2 and 4, the cover 60 is provided with downwardly extending ribs 120 spaced inwardly of the opposite side edges 110, 112. The ribs 120 support a plurality of spaced-apart rollers 125 mounted on axles 126 supported in the ribs. The rollers are seated in longitudinally extending channels 52, 52A. This facilitates easy rearward and forward rolling movement of the cover 60. The user grasps handle 130 when the tailgate 28 is in a down position and pulls the cover 60 rearwardly, thus providing the user access to the storage compartments 62, 64. When the cover is in the closed or fully engaged position shown in FIG. 1, the tailgate 28 may be closed, in which case the upper surface of the cover 60 can provide a load supporting surface for additional cargo items reinforced by vertical panels 80. The tailgate abuts the rear of the cover and end frame 150. A lock 151, shown as a hasp type lock, is provided at the rear of the cover 60.

The rear of the cargo area is defined by a vertical frame 150 having adjacent access openings 154 and 154A which are respectively aligned with compartments 62 and 64. The openings 154, 154A each receive a door 160 which is hinged along its bottom edge to the frame at 166. The doors 160 are provided with suitable latches or locks 153 to retain the doors in the closed position. As a further security feature, with the tailgate closed and in a locked position, access to the doors 160 and 160A is blocked as the tailgate abuts the doors.

In use, the combination liner and storage compartment is installed in a truck. The particular dimension and shape of the unit may vary somewhat in accordance with the make and model of the truck. Once in position, the user may access storage areas 62, 64 by opening the tailgate and pulling the cover 60 rearwardly at handle 130. The cover will slide easily on rollers 125. The user may then lean over the side panels of the truck bed to place or remove items from the storage compartments. The cover 60 may be moved to a forward position and access to the storage compartments is accommodated at the rear of the truck by opening either or both of the access doors 160. Partition or panels 80 may be inserted at suitable locations by engaging the panels in the aligned vertical slots 65, 66. This provides area for segregating different kinds of stored items. The panels may be inserted with the recess upwardly as seen in the right-hand channel 64 in FIG. 2, or may be inserted with the recess extending downwardly. In this position, longer items such as items represented by the numeral 90 may be inserted into the storage area 62 extending substantially the length of the truck bed. The upper surface of cover 60 defines the floor of a cargo area in the truck bed which may be utilized in conventional manner.

Referring to FIG. 4, small weep holes 170 may be provided in the channel and liner. These allow moisture that may leak around the edge of the cover to accumulate in this channel and drain downwardly. Aligned holes 172 may also be provided in the truck body, as for example, in the bed and liner, to provide a path for drainage or moisture.

Figure 11:
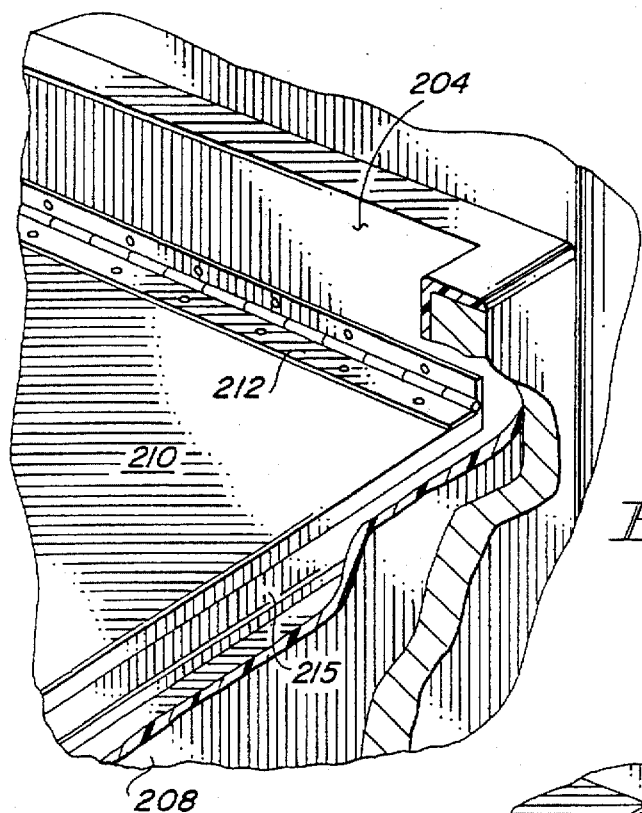
FIG. 11 is an enlarged detail view of the hinge connection between the cover and the liner of the embodiment shown in FIG. 9.

Referring to FIGS. 9 and 11, an alternate embodiment of the present invention is shown which is generally designated by the numeral 200. In this embodiment, the truck bed liner is as has been described above having a floor 202, front wall 204, rear wall 206 and side walls 208. Cover 210 is shown as a rigid planar member secured to the front wall of the liner by a continuous piano hinge 212, as best seen in FIG. 11. Access to the storage compartments is obtained by pivoting the cover 210 upward as shown in FIG. 9. The cover 210 seats in channels 215 at the side walls in a closed position and is pivotal to the open access position seen in FIG. 9.

Figure 10:
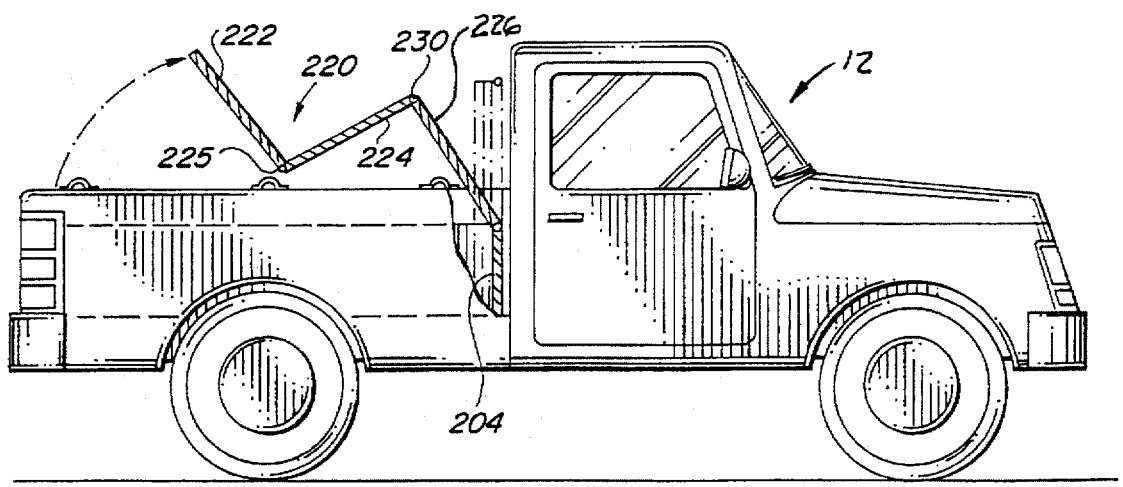
FIG. 10 is a side view of an alternate embodiment of the present invention.

An alternate cover configuration is shown in FIG. 10. In this configuration, the cover 220 is divided into a plurality of sections 222, 224 and 226 which are pivotally joined to one another at hinged connection 225 and 230. Forward section 226 is hinged to the front wall 204 of the liner. The cover may be moved forward to an open position in folded or accordion fashion as shown in FIG. 10. With the cover rearwardly extended, it provides a continuous planar cover over the compartment and provides a load-supporting surface for the cargo area. In the closed position, the cover rests on channel supports on either side wall.

Figure 12:
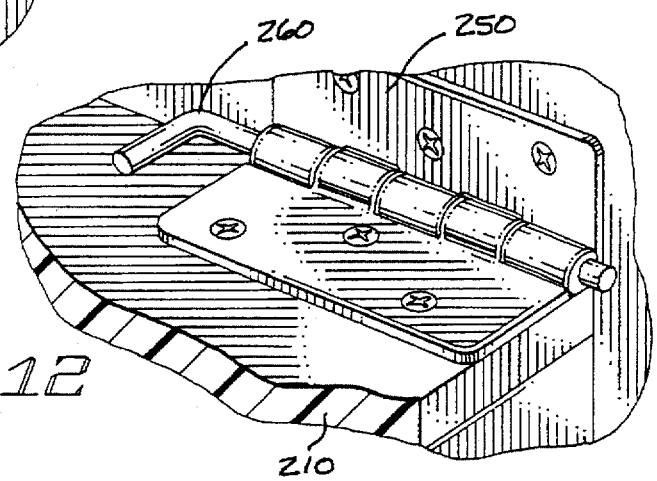
FIGS. 12 and 13 are both detail views showing an alternate hinge arrangement in which the cover is detachable from the liner with FIG. 12 showing the hinge components connected and FIG. 13 showing them disconnected.
Figure 13:
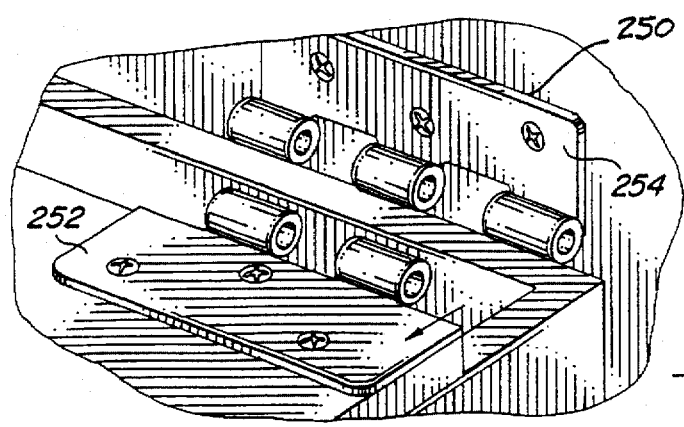

In FIGS. 12 and 13, planar cover 210 is shown hingedly secured to the forward wall of the liner by a pair of hinges 250 each having opposite hinge plates 252, 254. Hinge plate 252 is secured to the cover 210 and hinge plate 254 is secured to the front wall of the liner by suitable fasteners. A removable hinge pin 260 joins the hinge plates. The cover may be removed by withdrawing the hinge pin 260 as shown in FIG. 13. With the hinge pin removed, the cover 210 may be lifted from the truck bed to provide access to the storage compartments.

Another optional feature of the invention is shown in FIG. 8. In FIG. 8, an elongate storage box 290 is dimensioned to be received within one of the storage compartments 64. The box 290 has an open top and is slidably receivable within one of the storage compartments. The storage box or drawer may be extended to the position shown in FIG. 8 and a leg 292 may be downwardly pivoted about pivot point 294 to provide support for the outer end of the drawer. The inner end of the drawer is supported on the upper surface of the tailgate as shown. The drawer may be provided with rollers 295 to accommodate movement of the drawer. Thus, easy access is provided to the drawer which is particularly convenient for workmen to store and access tools and parts. The drawer is an open compartment and may also be used as a work surface to support such items as plywood panels.

It will be appreciated that the storage unit of the present invention may be used for both commercial and recreational purposes. Items of various sizes and lengths can be easily and conveniently stored. The partitions allow items to be segregated and still permit longer items to be carried. The pull-out drawers can accommodate sporting equipment as well as parts and tools.

While the principles of the invention have been made clear in the illustrative embodiments set forth above, it will be obvious to those skilled in the art to make various modifications to the structure, arrangement, proportion, elements, materials, and components used in the practice of the invention. To the extent that these various modifications do not depart from the spirit and scope of the appended claims, they are intended to be encompassed therein.

I claim:

1. A storage unit for mounting in a bed of a pickup truck having side panels, a front wall, a floor, and a tailgate at a rear of the bed, said storage unit comprising:

(a) a liner having a front end, opposite side walls, and a floor adapted to conform to the truck bed;

(b) a vertical divider extending generally longitudinally along said liner from the front wall to the rear of the bed;

(c) support means positioned on said liner opposite side walls; and (d) a generally planar cover having an upper surface defining a cargo-supporting area, said cover resting on said support means in a closed position and being moveable to an open position, said cover having roller members disposed at opposite edges and said support means including a channel receiving said roller members whereby said cover is slidable between said open and closed positions.

2. The storage unit of claim 1 wherein said liner further includes an end wall defining access doors.

3. The storage unit of claim 1 wherein said liner side walls include a plurality of tie-downs integrally formed therewith.

4. The storage unit of claim 1 wherein said liner and said cover are fabricated from a polymeric material.

5. The storage unit of claim 1 further including weep holes at selected, predetermined locations in said liner to facilitate drainage of moisture.

6. A storage unit for mounting in a bed of a pickup truck having side walls, a front wall, a floor, and a tailgate at a rear of the bed, said storage unit comprising:

(a) a liner having a front end, opposite side walls and a floor adapted to conform to the truck bed;

(b) a vertical divider extending generally longitudinally along said liner from the front wall to the rear of the bed defining storage compartments on opposite sides thereof;

(c) support means positioned on said opposite liner side walls;

(d) a generally planar cover having a closed position overlying said liner and having an upper surface defining a cargo-supporting area, said cover being moveable to an open position to provide access to said storage compartments;

(e) said liner side walls and said vertical divider defining spaced-apart vertical slots; and (f) panels removably securable in said slots, said panels defining recesses therein to accommodate insertion of longer, stored items in said compartments, said panels when secured in said slots extending between the liner floor and the cover to structurally support said cover when said cover is in said closed position.

7. The storage unit of claim 6 wherein said cover has roller members disposed at opposite edges and said support means comprises a channel whereby said cover is slidable between said open and closed position.

8. The storage unit of claim 6 wherein said liner includes an end wall defining access doors aligned with said compartments, said end wall being positioned adjacent said tailgate when said tailgate is in a closed position.

9. The storage unit of claim 6 wherein said liner side walls include a plurality of tie-downs integrally formed therewith.

10. The storage unit of claim 6 wherein said liner and said cover are fabricated from a polymeric material.

11. The storage unit of claim 6 further including weep holes at selected, predetermined locations in said liner to facilitate drainage of moisture.

* * * * *